United States Patent [19]

Engel et al.

[11] 4,296,432
[45] Oct. 20, 1981

[54] DYNAMIC ENABLING NETWORK FOR A COLOR CORRECTION CIRCUIT

[75] Inventors: Christopher M. Engel, Arlington Heights; Gopal K. Srivastava, Buffalo Grove, both of Ill.

[73] Assignee: Zenith Radio Corporation, Glenview, Ill.

[21] Appl. No.: 172,903

[22] Filed: Jul. 28, 1980

[51] Int. Cl.³ .......................................... H04N 9/535
[52] U.S. Cl. .......................................... 358/28
[58] Field of Search .......................................... 358/28

[56] References Cited

U.S. PATENT DOCUMENTS 3,882,534  5/1975  Srivastava .......................... 358/28
4,084,178  4/1978  Srivastava et al. .................. 358/28

Primary Examiner—John C. Martin

[57] ABSTRACT

A dynamic enabling network is described for turning off and on a color correction network in a color television receiver. The enabling network receives and combines selected color-difference signals which are superimposed on a D.C. bias level so as to generate a first control signal whose amplitude is near a maximum when the color-difference signals are representative of fleshtone hues. A second control signal, also derived from the selected color-difference signals, is a D.C. signal whose amplitude is a function of the D.C. bias level associated with the selected color-difference signals. Both control signals are applied to a comparator for turning on the color correction circuit only when the difference in amplitude between the two control signals is indicative of hues within a selected range of fleshtones.

12 Claims, 4 Drawing Figures

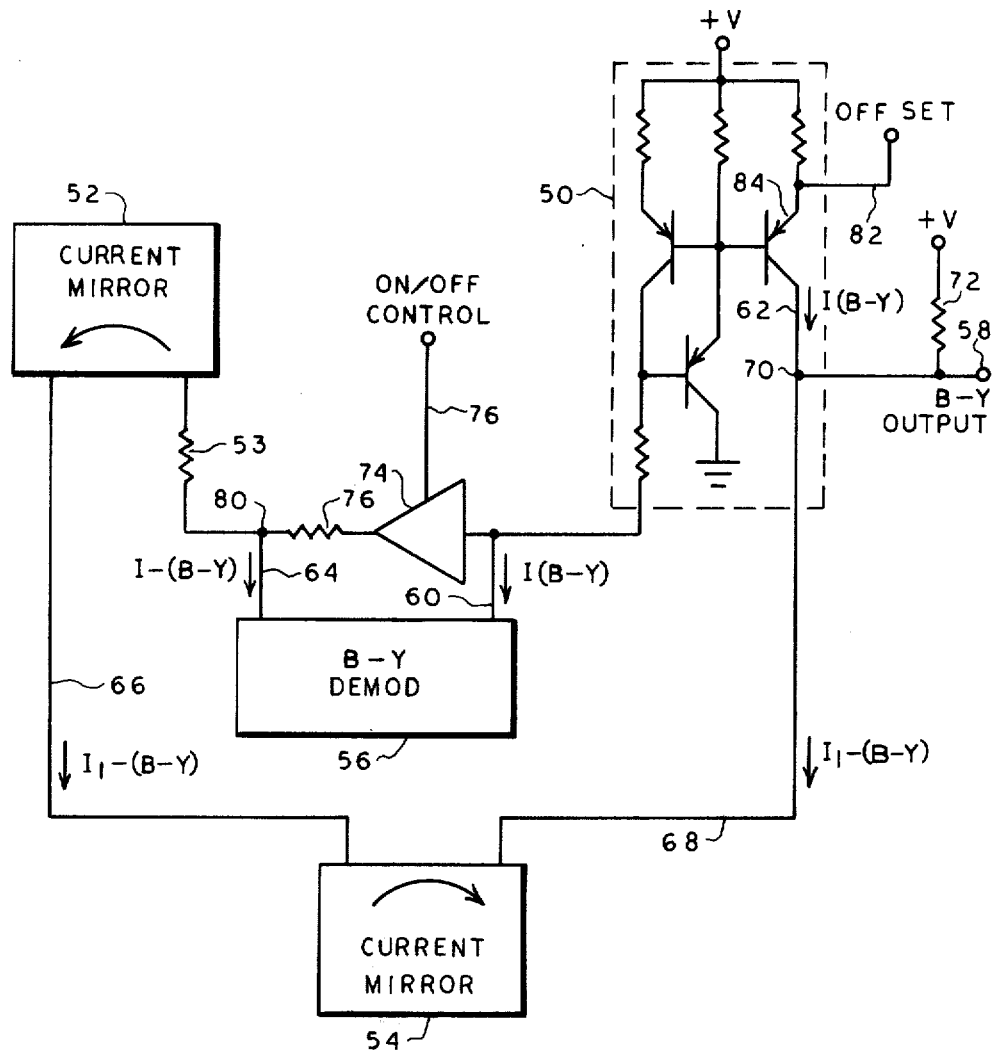
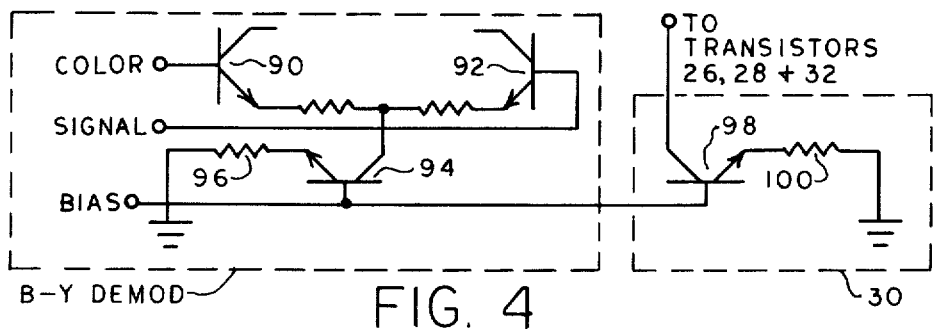

DYNAMIC ENABLING NETWORK FOR A COLOR CORRECTION CIRCUIT

BACKGROUND OF THE INVENTION

The invention is directed generally to automatic color correction circuits for use in color television receivers. The invention is specifically directed to an improved network for automatically enabling such a color correction circuit when broadcast color signals have a hue within a selected range of fleshtone hues, and for disabling the color correction circuit at other times.

Most modern color television receivers include color correction circuitry for automatically modifying the hues of reproduced color images in order to develop fleshtones whose hues are more consistent than those which are broadcast. Some color correction circuits alter the phase of 3.58 MH$_z$ color signals prior to their demodulation, and other such circuitry operates on demodulated color signals to provide hue correction. Irrespective of which approach is used, it is preferable to alter the hues of only those color signals which are representative of fleshtones, or those which are within a selected range of fleshtone hues. Color signals such as blues and greens which are far removed from fleshtones are preferably not modified.

For this purpose, it has been proposed to automatically enable the color correction circuit when color signals within a range of fleshtones are received, and to disable the color correction circuit at all other times. The problem which has arisen in the implementation of this approach is that it has been difficult to enable the color correction circuit only over a relatively precise range of color signals. The result has been that similar color television receivers have been unable to reliably and consistently produce similar color images.

Another factor which must be accounted for in the design of enabling networks for color correctors is the trend toward complete integration of the signal processing circuitry in television receivers. Hence, any such enabling network should be capable of construction in integrated circuit form, and should particularly not require the use of an excessive number of input/output pins for coupling the enabling network to discrete circuit components.

OBJECTS OF THE INVENTION

It is a general object of the invention to provide an improved enabling and disabling network for a color corrector in a color television receiver.

It is a more specific object of the invention to provide such a network which enables the color corrector only within a consistent, predetermined range of fleshtone hues.

It is another object of the invention to provide such a network which is readily adaptable to construction in integrated circuit form without the need for an excessive number of input/output pins.

BRIEF DESCRIPTION OF THE FIGURES

The objects stated above and other objects of the invention are more particularly set forth in the following detailed description and in the accompanying drawings of which:

FIG. 3 shows an exemplary color correction circuit and the way it may be interfaced with the network of FIG. 1; and FIG. 4 shows a preferred form of the current source 30 of FIG. 1.

DESCRIPTION OF THE PREFERRED EMBODIMENT

Figure 1:
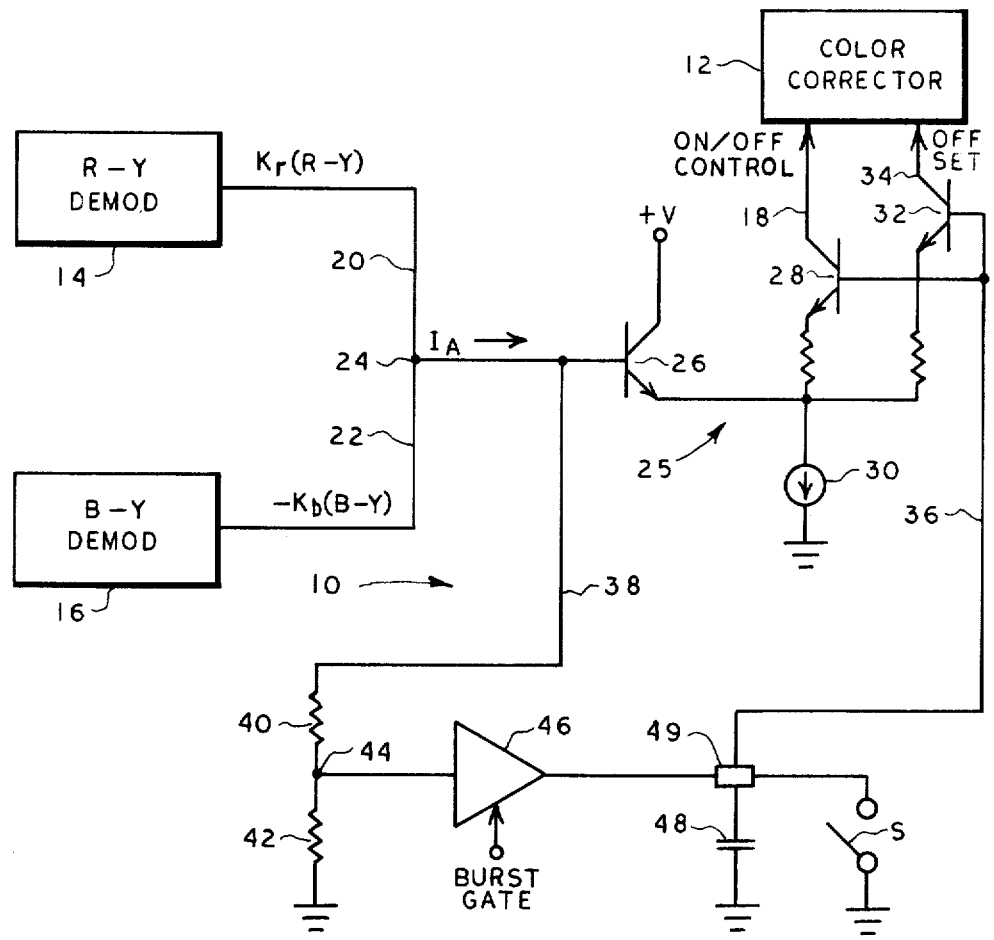
FIG. 1 illustrates an enabling and disabling network according to the invention for controlling the operation of a color correction circuit.

Referring to FIG. 1, there is shown a network 10 for dynamically enabling and disabling a color correction circuit 12. The correction circuit 12 may be of the type which receives demodulated color-difference signals and modifies those signals so that the images they develop on a television screen have more consistent fleshtone hues. An exemplary color correction circuit with which the present network 10 operates is described hereinafter.

Generally, the network 10 combines and processes selected color-difference signals, as from any suitable R-Y demodulator 14 and B-Y demodulator 16, so as to enable the color correction circuit 12 via an on/off lead 18 whenever the color-difference signals represent color information within a selected range of fleshtones. Once enabled, the correction circuit 12, which receives unmodified color-difference signals, operates on its received color-difference signals to effect the desired correction.

When the color-difference signals received by the network 10 are representative of color information which is not within the selected range of fleshtones, the network 10 disables the correction circuit 12. Thus, no correction will be applied to color-difference signals such as greens and blues which are far removed from fleshtones.

In the illustrated embodiment, the network 10 receives an R-Y color-difference signal via a lead 20 from the demodulator 14, and a (B-Y) color-difference signal via a lead 22 from the demodulator 16. The color-difference signals on leads 20 and 22 are combined at a node 24 to produce a control signal $I_a$ which is applied to a comparator 25 comprising emitter-coupled transistors 26 and 28. These transistors receive an operating current from a D.C. current source 30 so that transistors 26 and 28 operate essentially as a differential amplifier. Another transistor 32 parallels the transistor 28 to provide an optional offset signal at a lead 34 for use by a particular type of correction circuit 12. The nature of the offset signal and its purpose are described hereinafter.

Figure 2:
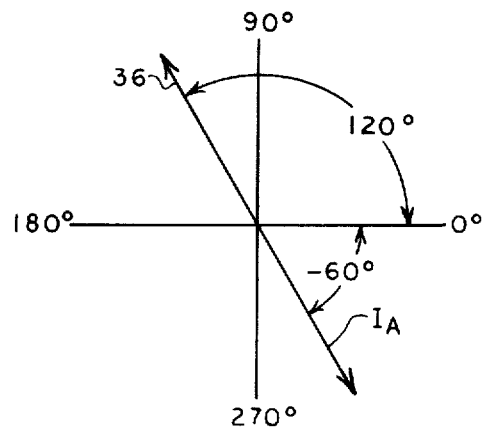
FIG. 2 is a vector diagram useful in describing the operation of the network shown in FIG. 1.

In order to sense when the B-Y and R-Y color-difference signals represent color information within a selected range of fleshtones, selected proportions of those color-difference signals are combined to develop the control signal $I_a$. For example, a fraction $K_r$ of the R-Y signal and a fraction $K_b$ of a negative B-Y signal are coupled from the demodulators 14 and 16 to the node 24. The factors $K_r$ and $K_b$ are selected such that the combined color-difference signals at node 24 have a substantially maximum amplitude when the demodulators receive color signals whose hues are aligned with a fleshtone axis. To achieve this result, the factor $K_r$ may be selected to be approximately unity and the factor $K_b$ may be selected to be approximately 0.47. To explain the latter comment more fully, reference is made to FIG. 2 in which a vector 36 represents the fleshtone axis. As shown, that axis is approximately at 120 degrees. When a color signal received by the demodulators has a phase of 120 degrees, the proportioned and combined color-difference signals ($-K_b$ (B-Y)+$K_r$ (R-Y)) are at an angle of $-60$ degrees as shown by the control signal vector $I_a$. At this angle, the control signal vector is at a maximum amplitude, and, as broadcast hues change phase on either side of the vector 36, the amplitude of the vector $I_a$ decreases. Thus, the amplitude of the control signal $I_a$ is indicative of broadcast hues, and this information is employed by the network 10 to enable the correction circuit 12 only when those hues are within a selected range of the fleshtone axis 36.

The signals $K_r$(R-Y) and $-K_b$(B-Y) may be derived from output voltages supplied by conventional demodulators and may be converted to proportioned currents by current mirrors such as those described in U.S. application Ser. No. 161,839, filed June 23, 1980. The resultant currents are then summed at the node 24 to develop the control signal $I_a$.

It will be appreciated that conventional demodulator outputs include an A.C. color-difference component superimposed on a D.C. bias level. Hence, the control signal $I_a$ will also have a D.C. level which corresponds to the D.C. bias level associated with the combined color-difference signals. The comparator 25 is, of course, responsive to both the D.C. as well as the A.C. components of the control signal $I_a$. Because it is the A.C. component of the control signal $I_a$ which contains the useful information concerning the hues of the broadcast signal, it is desirable to counteract the effects which any fluctuation in the D.C. bias level of the color-difference signals may have on the comparator 25. Accordingly, a second D.C. control signal, whose amplitude is a function of the amplitude of the D.C. bias level associated with the combined color-difference signals, is derived from those color-difference signals and applied to the transistor 28 in the comparator 25 via a lead 36. Thus, the base of the transistor 28 receives the second control signal which is in the form of a D.C. reference voltage which the comparator 25 compares to the amplitude of the first control signal $I_a$. In general, when the control signal $I_a$ is of the polarity indicated in FIG. 2, it will be more negative than the D.C. control signal received by the transistor 28. In that condition, the transistor 26 is off, the transistor 28 is on, and an operating current is supplied by the transistor 28 in its collector lead 18 for enabling the color correction circuit 12. When the broadcast hues are not within a fleshtone range, or are of very small amplitude, the transistor 26 is conductive and the transistor 28 is turned off, thereby removing operating current from the lead 18 so as to disable the color correction circuit 12.

To develop the second D.C. control signal, the combined color-difference signals are applied via a lead 38 to a voltage divider comprising resistors 40 and 42. Thus, there is developed at junction 44 a signal which is a selected fraction of the combined color-difference signals, including their associated D.C. bias level. The signal at node 44 is coupled to an input of a conventional gated follower 46 for detection of the D.C. level of the signal at junction 44 and for storing a D.C. signal corresponding to that D.C. level on a storage capacitor 48.

To separate the D.C. component of the signal at junction 44 from its A.C. component, the follower 46 receives a burst gate signal which occurs during the burst interval of a conventional NTSC television signal. When the follower 46 is activated by the burst gate signal, it couples to the capacitor 48 the voltage which is then received from the junction 44. Because color information is blanked from the color-difference signals during the burst interval, the signal at the junction 44 during the burst gate interval comprises but a D.C. component whose amplitude is a function of the D.C. bias level associated with the combined color-difference signals at the node 24. Hence, the capacitor 48 stores whatever D.C. voltage is present at the node 24 during the burst gate interval, and that stored voltage, corresponding to a D.C. control signal, is coupled via the lead 36 to the comparator 25.

Preferably, the amplitude of the D.C. control signal on the lead 36 is a selected fraction of the amplitude of the D.C. bias level associated with the control signal $I_a$. Such proportioning of the D.C. control signal is effected by virtue of the voltage divider comprising the resistors 40 and 42. It has been found that effective operation of the comparator 25 is achieved when the resistors 40 and 42 are selected such that the amplitude of the D.C. control signal on the lead 36 is approximately 90 percent of the bias level associated with the first control signal $I_a$. This result may be achieved by selecting the resistor 44 to be approximately 200 ohms and selecting the resistor 42 to be approximately 3,000 ohms.

The result of the arrangement described above is that when a broadcast television signal contains no color components, control signal $I_a$ will include no A.C. color-difference components but will include the D.C. bias level which is established by the demodulators 14 and 16. That D.C. bias level is, because of the effect of the voltage dividing resistors 40 and 42, greater in amplitude than the D.C. control signal on the lead 36. Hence, under that condition, the transistor 26 will be on and the transistor 28 will be off in order to remove operating current from the lead 18 and thus to disable the color correction circuit 12.

When the broadcast signal includes fleshtone hues of a sufficient amplitude, the A.C. component of the control signal $I_a$ has a negative polarity which causes the instantaneous amplitude of the control signal $I_a$ to be smaller in magnitude than the instantaneous value of the D.C. control signal on the lead 36. Under that condition, the transistor 26 is turned off and the transistor 28 becomes conductive for supplying operating current in the lead 18 to enable the color correction circuit 12.

In the illustrated embodiment, combining the R-Y and B-Y color-difference signals as described above results in enablement of the color correction circuit 12 whenever broadcast hues range from about 30 degrees to 210 degrees. In other words, the color correction network 12 is enabled or activated whenever the broadcast hues are within plus or minus approximately 90 degrees of the fleshtone axis 36 shown in FIG. 2.

The circuitry comprising the network 10 is designed to be readily fabricated in integrated circuit form so that it may be included on a single chip with the demodulators 14 and 16 and the color correction circuit 12. The only component of the network 10 which is not readily integrated is the capacitor 48. Hence, a pin 49 is shown for coupling the capacitor 48 to the other components of the network 10. With this arrangement, the pin 49 is the only input/output pin required by the network 10.

For applications in which it is desirable to provide for manual override of the network 10, a switch S may be coupled to the pin 49 as shown. When the switch S is in its illustrated open position, the network 10 operates normally in the manner described above. When the switch 10 is manually closed, the capacitor 48 becomes grounded and the D.C. control signal is removed from the lead 36. Hence, the transistor 28 is turned off and held off as long as the switch S is closed. Note that this manual override option is possible without adding an additional input/output pin.

As mentioned previously, the transistor 32 may be included in order to develop an offset current in the lead 34 for use by a particular type of color correction circuit 12. Because the transistors 32 and 28 are in parallel, they will be off and on during the same intervals, wherefore the transistor 32 will develop an offset current in the lead 34 only during those times when the transistor 28 enables the color correction network 12.

Referring now to FIG. 3, there is shown a type of color correction network which may be enabled and disabled by the network 10 of FIG. 1 and which employs the offset current developed by the transistor 32 of FIG. 1. The illustrated color correction network is described in detail in U.S. application Ser. No. 167,989, filed July 14, 1980 and is described but briefly herein.

The illustrated network includes current mirrors 50, 52, and 54 which process B-Y color-difference currents derived from a B-Y demodulator 56 so as to generate a B-Y color-difference output at terminal 58. Toward this end, a current I (B-Y) is developed in a lead 60 by the demodulator 56, and that current is received by the current mirror 50 for developing a corresponding current I (B-Y) in another lead 62. The demodulator 56 generates a complementary current output I-(B-Y) at a lead 64 which is received by the current mirror 52 via a resistor 53. When color correction is not taking place, the mirror 52 generates a current $I_1$-(B-Y) in a lead 66, which current corresponds to the current in the lead 64. The third current mirror 54 receives the current from the lead 66 for developing a corresponding current $I_1$-(B-Y) in a lead 68 which couples to lead 62 at a node 70. A load resistor 72, one end of which is coupled to a positive voltage source (+V) has its other end coupled to the node 70 and to the output terminal 58 as illustrated. With this arrangement, a current is developed from the node 70 to the output terminal 58 which corresponds to I (B-Y) plus $I_1$ (B-Y), and it is this signal which constitutes the B-Y color-difference output.

As thus far described, the network shown in FIG. 3 merely converts the current outputs of the demodulator 56 to a color-difference output at the terminal 58. To effect color correction, there is included a follower 74 which is turned off and on by the on/off control signal developed at lead 18 in FIG. 1. The lead 18 is coupled to a lead 76 (FIG. 3) for coupling operating current to the follower 74 to turn the latter device on when color correction is to take place. In operation, the follower 74 couples current from the lead 60 through a resistor 76 to a node 80 where that current is summed with the current in the lead 64. Because the currents in the leads 60 and 64 are of opposite polarity, a reduced amplitude negative B-Y signal is received by the current mirror 52, wherefore the current developed by the mirror 52 in the lead 66 has an amplitude which is reduced from that which occurs when no correction takes place. Consequently, the current in the lead 68 which is developed by the current mirror 54 is also reduced in amplitude, as is the color-difference signal developed at the terminal 58.

The result obtained by the above-described reduction in the amplitude of the B-Y color-difference signal at terminal 58 is that the hues of color images developed from the reduced amplitude B-Y signal and non-corrected G-Y and R-Y color-difference signals are compressed toward the R-Y axis (+90 degrees). That is, broadcast hues which are within plus or minus 90 degrees of the fleshtone axis are caused to have a hue whose phase vectors are directed closer to the R-Y axis. In order to bring these reproduced hues closer to the fleshtone axis, the offset current developed in the lead 34 by transistor 32 (FIG. 1) is coupled via a lead 82 (FIG. 3) to the emitter of a transistor 84. The offset current thus received by the transistor 84 reduces its conduction and thereby reduces the amplitude of the current coupled to the node 70 via lead 62. This operation is equivalent to applying a negative B-Y current to the node 70 and the effect is to swing the hues of the corrected color images toward the fleshtone axis.

Another aspect of the invention concerns the way in which the value of the offset current developed by the transistor 32 (FIG. 1) is controlled. Referring now to FIG. 4, there is shown some fo the circuitry which is associated with the B-Y demodulator and a preferred construction of the current source 30. As shown, the B-Y demodulator typically includes a differential amplifier comprising transistors 90 and 92. The latter transistors receive 3.58 megahertz color signals at their bases, and their collectors couple to additional circuitry (not shown) for demodulating the color signals.

To power the demodulator, a current source comprising a transistor 94 and an emitter resistor 96 respond to a bias input voltage for coupling a D.C. current to the emitters of transistors 90 and 92. The amplitude of the color-difference signals developed by the B-Y demodulator is, of course, a function of the value of the D.C. current developed by the transistor 94.

Typically, the receiver also includes an R-Y demodulator which has a current source similar to the transistor 94 and resistor 96, and which is coupled to the transistor 94 such that the R-Y demodulator's current source tracks with the B-Y demodulator's current source.

It is preferred that the value of the offset current developed by the transistor 32 track with the value of the demodulators' current sources. For this purpose, the current source 30 includes a transistor 98 whose base receives the same bias voltage as is applied to the transistor 94, and an emitter resistor 100. The transistors 94 and 98 may match each other, as may the resistors 96 and 100. Thus, the collector current of the transistor 98 matches the collector current of the transistor 94, and the offset current received by the color corrector tracks with the operating current of the demodulator. That is, variations in the demodulator's operating current result in corresponding variations in the offset current.

It will be apparent that the enabling and disabling network 10 may be used with any kind of color correction circuit which can be turned on by supplying operating current to it and turned off by removing the operating current from it. Employing the described network for such control results in color correction over a relatively precise range of hues, particularly since any variations in the D.C. bias output of the demodulators is compensated for. Hence, temperature-induced variations and manufacturing variations in that D.C. bias do not substantially affect the hue range over which color correction takes place. Consequently, similarly designed color television receivers reliably and consistently produce similar color images.

Although the invention has been described in terms of a preferred structure, it will be obvious to those skilled in the art that many alterations and modifications thereto may be made without departing from the invention. Accordingly, it is intended that all such alterations and modifications be included within the spirit and scope of the invention as defined by the appended claims.

What is claimed is:

1. In a television receiver which provides color-difference signals having A.C. components superimposed on a D.C. bias level, and in which a color correction circuit automatically operates on the color-difference signals to adjust their effective phase toward a fleshtone axis, a dynamic enabling and disabling network for the color correction circuit, comprising:
    means for combining selected color-difference signals to generate a first control signal having a D.C. level corresponding to the D.C. bias level of the color-difference signals and having an A.C. component whose magnitude is near a maximum when the color-difference signals are representative of fleshtone hues;
    means responsive to said selected color-difference signals for generating a second D.C. control signal whose amplitude is a function of the D.C. bias level of the selected color-difference signals;
    a comparator receiving the first and second control signals for generating an enable output signal when the difference in amplitude between the first and second control signals is indicative of color-difference signals having a phase within a preselected range of fleshtone hues, and for generating a disable output signal when no such difference in amplitude exists; and
    means for coupling the output signals of the comparator to the color correction circuit.

2. A network as set forth in claim 1 wherein said means for generating a second control signal includes means for sampling at least a fraction of said D.C. bias level during burst gate intervals such that the second control signal corresponds to the sampled D.C. bias level.

3. A network as set forth in claim 2 including means for coupling the first control signal to said sampling means for sampling thereof so that the sampling means samples combined color-difference signals.

4. A network as set forth in claim 2 wherein a selected fraction of said D.C. bias level is sampled by said sampling means such that the second control signal has a D.C. amplitude which is less than the D.C. amplitude of the first control signal so that said comparator generates a disable signal when the control signal includes relatively small amplitude color-difference signals and color-difference signals indicative of hues outside the preselected range of fleshtone hues.

5. A network as set forth in claim 1 wherein the color correction circuit is adapted to receive an offset current for shifting the effective phases of the color-difference signals toward the fleshtone axis, and wherein said comparator includes means for generating the offset current simultaneously with the generation of its enable output signal.

6. A network as set forth in claim 1 wherein R-Y and B-Y color-difference signals are combined to generate the first control signal.

7. A network as set forth in claim 6 wherein said means for generating the second control signal is adapted to receive a selected fraction of combined R-Y and B-Y color-difference signals for generating a second D.C. control signal whose amplitude is a selected fraction of the amplitude of the D.C. level of said first control signal and wherein the comparator generates a disable signal when the amplitude of the first control signal is smaller than the amplitude of the second control signal so that the color correction circuit is disabled when the first control signal includes relatively small amplitude color-difference signals indicative of hues outside the preselected range of fleshtone hues.

8. In a television receiver which provides color-difference signals having A.C. components superimposed on a D.C. bias level, and in which a color correction circuit automatically operates on the color-difference signals to adjust their effective phase toward a fleshtone axis, a dynamic enabling and disabling network for the color correction circuit comprising:
    means for combining a selected fraction of an R-Y color-difference signal with a selected fraction of a B-Y color-difference signal to generate a first control signal having a D.C. level corresponding to the D.C. bias level associated with the combined color-difference signals and having an A.C. component whose magnitude is maximum when the color-difference signals are representative of fleshtone hues;
    means for sampling the combined color-difference signals during a burst gate interval to generate a second D.C. control signal whose amplitude is a selected fraction of the D.C. bias level of the combined color-difference signals;
    a comparator responsive to the first control signal being larger in amplitude than the second control signal for generating a disable signal, and responsive to the first control signal being smaller in amplitude than the second control signal for generating an enable signal; and
    means for coupling the enable and disable signals to the color correction circuit.

9. A network as set forth in claim 8 wherein said sampling means includes a storage capacitor and means for storing on said capacitor a selected fraction of the D.C. bias level associated with said combined color-difference signals, the voltage stored on said capacitor corresponding to the second control signal.

10. A network as set forth in claim 8 wherein said comparator includes a pair of emitter-coupled transistors receiving a current source, one of said transistors receiving the first control signal at its base and the other transistor receiving the second control signal at its base, said other transistor having a collector for steering an enable signal in the form of operating current to the color correction network.

11. In a television receiver which provides color-difference signals having A.C. components superimposed on a D.C. bias level, and in which a color correction circuit automatically operates on the color-difference signals to adjust their effective phase toward a fleshtone axis, a dynamic enabling and disabling network for the color correction circuit, comprising:
    means for combining a selected fraction of an R-Y color-difference signal with a selected fraction of a B-Y color-difference signal to generate a first control signal having a D.C. level corresponding to the D.C. bias level associated with the combined color-difference signals and having an A.C. component whose magnitude is maximum when the color-difference signals are representative of fleshtone hues;

a voltage divider coupled to the combined color-difference signals for outputting a selected fraction of the combined color-difference signals;

a storage capacitor;

means for gating onto the storage capacitor the output of said voltage divider during burst intervals;

a pair of emitter-coupled transistors receiving a source of D.C. current, a first of said transistors having a base receiving said first control signal and a second of said transistors having a base coupled to said storage capacitor for conducting when the voltage on said capacitor exceeds the amplitude of the control signal; and means for coupling the current conducted by said second transistor to the color correction circuit for enablement thereof.

12. A network as set forth in claim 11 wherein the television receiver includes at least one demodulator for developing the color-difference signals, wherein said demodulator is powered by a further D.C. current source, wherein the color correction circuit is adapted to receive an offset current for shifting the effective phases of the color-difference signals toward the fleshtone axis, wherein the current carried by said D.C. current source tracks with the current carried by said further D.C. current source, and further including an additional transistor coupled to said second transistor so as to generate, when said second transistor is conductive, an offset current whose value tracks with the current carried by said further D.C. current source.

* * * * *